Patented Mar. 19, 1946

2,396,659

UNITED STATES PATENT OFFICE 2,396,659

METALLIZABLE TRIAZINE AZO COMPOUNDS

Otto Kaiser, Basel, Switzerland, assignor to the firm of Society of Chemical Industry in Basle, Basel, Switzerland No Drawing. Application July 11, 1941, Serial No. 402,023. In Switzerland July 19, 1940

9 Claims. (Cl. 260—153)

In U. S. Patent No. 2,084,731, among other things, it is pointed out that valuable dyestuffs are obtained if the diazotized aminoazo dyestuffs obtained by the union of diazotized aminosalicylic acids and 1-amino-2-methoxynaphthalene sulphonic acids are combined with the ternary condensation products which are themselves obtained by reaction of one molecule of a cyanuric halide, such as cyanuric chloride or cyanuric bromide, with one molecule of a 1-amino-8-hydroxynaphthalene sulphonic acid, one molecule of an aminoazo dyestuff of the type of 4-amino-4'-hydroxyazobenzene-3'-carboxylic acid and 1 molecule of a primary or secondary amine. The dyestuffs thus obtained can be remarkable for, firstly, the purity of their dyed shades and, secondly, the good wet-fastness properties of their dyeings which have been developed with copper compounds.

It has now been found that new dyestuffs can be obtained, the dyeings of which, when developed with copper compounds, exhibit still better wet-fastness properties, if the above mentioned ternary condensation products are combined with the diazotized mono-azo dyestuffs which are themselves obtained by coupling diazotized aminosalicylic acids with compounds of the general formula

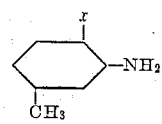

in which $x$ stands for hydrogen or alkoxy.

The same dyestuffs are also obtained if the diazotized monoazo dyestuff be first of all combined with the 1-amino-8-hydroxynaphthalene sulphonic acid in alkaline medium and the reaction between the disazo dyestuff and the cyanurichalide, the aminoazo dyestuff and the primary or secondary amine be then carried out, it being permissible for the latter reactions to take place in any desired sequence.

Finally, it is also possible to prepare primary or secondary condensation products from the 1-amino-8-hydroxynaphthalene sulphonic acid, next to unite these condensation products with the diazotized aminoazo dyestuff and then to carry out the other condensations, instead of combining the ternary condensation products with the diazotized aminoazo compounds.

As 1-amino-8-hydroxynaphthalene sulphonic acids there come in question: chiefly, 1-amino-8-hydroxynaphthalene-3:6-disulphonic acid, but also 1-amino-8-hydroxynaphthalene-4-sulphonic acid or -4:6-disulphonic acid, and so on. As aminoazo compounds of the type of 4-amino-4'-hydroxyazobenzene-3'-carboxylic acid, in addition to the product named, there come in question 4-amino-4'-hydroxyazobenzene-5'-methyl-3'-carboxylic acid, as well as other substitution products of these dyestuffs, such as 4-amino-3-chloro-, or -3-methoxy-, or -3-sulfo-4'-hydroxyazobenzene-3'-carboxylic acid.

Among the diazotized aminosalicylic acids, the most important by far are the diazo compounds of p-aminosalicylic acid and of 4-amino-1-hydroxybenzene - 2 - carboxy - 6 - sulphonic acid. Among the compounds of the general formula

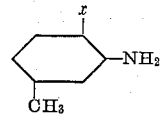

which has been explained above, the most important are m-toluidine and 1-amino-2-methoxy- or -2-ethoxy-5-methylbenzene.

Among the primary and secondary amines, both aliphatic and aromatic amines come into consideration, for example, monomethyl- or monoethylamine, monopropylamine, diethylamine, aniline, monomethylaniline, p-toluidine, β-naphthylamine, sulphonic and carboxylic acids of these compounds, aminoazo dyestuffs—among which aminoazo dyestuffs of the type of 4-amino-4'-hydroxyazobenzene-3'-carboxylic acid are also included—and, finally, polynuclear compounds, such as 4:4'-amino-benzoylamino - 1 - hydroxybenzene-2-carboxylic acid.

It has also been found that dyestuffs which behave in a quite similar manner are obtained if the cyanuric chloride or cyanuric bromide be replaced by its heterocyclic equivalent, for example, by 1-phenyl-3:5-dichlorotriazine, dichloroquinazoline, tribromopyrimidine, 4-methyl-2:6-dichloropyrimidine, etc.

Thus, in the free state, the new dyestuffs correspond to the general formula

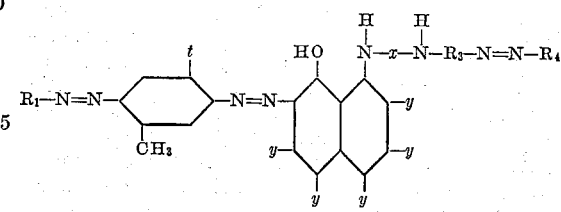

in which $R_1$ and $R_4$ represent radicals of mononuclear compounds of the benzene series, which contain, as substituents, at least one OH-group and one COOH-group in the o-position to this OH-group; $t$ represents hydrogen or an alkoxy group; $R_3$ represents a nucleus of the benzene series, in which the —NH-group and the —N=N-group are placed in a position other than the o-position to each other; in which at least one $y$ and at most two $y$-groups represent sulphonic groups and the other $y$-groups hydrogen atoms, provided that when two $y$-groups represent sulphonic groups they are separated by at least one y-group representing a hydrogen atom and, if the y-group in the 2-position represents a sulphonic group, the y-group in the 4-position shall also represent a sulphonic group; and in which, finally, x represent a connecting member of the triazine series or of another analogous heterocyclic series.

Among such products those dyestuffs are particularly valuable which, in the free state, correspond to the general formula

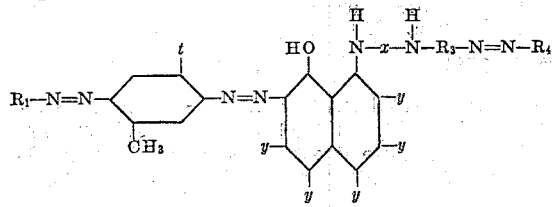

wherein $R_1$ and $R_4$ represent radicals of mononuclear compounds of the benzene series which contain, as substituents, at least one OH-group and one COOH-group in the o-position to this OH-group, $t$ represents hydrogen or an alkoxy group, $R_3$ represents an arylene radical of the benzene series in which the —NH-group and the —N=N-group are placed in p-position to each other, wherein $x$ and $y$ have the meanings alone indicated.

The following examples illustrate the invention without in any way restricting it:

*Example 1*

30.1 parts of the aminoazo compound obtained from diazotized 4-amino-1-hydroxybenzene-2-carboxylic acid and 1-amino-2-methoxy-5-methylbenzene are diazotized at 15–20° C. in 500 parts of water with 28 parts of hydrochloric acid of 30 percent strength and 6.9 parts of sodium nitrite. After 2 hours, the diazo-azo compound formed is filtered, and the residue on the filter is added in an aqueous suspension to an aqueous solution of 10 percent strength of 74.5 parts of the ternary condensation product derived from 1 molecule of cyanuric chloride, 1 molecule of 1-amino-8-hydroxynaphthalene-3:6-disulphonic acid, 1 molecule of 4-amino-4'-hydroxybenzene-3'-carboxylic acid, and 1 molecule of aniline, to which 50 parts of an ammonia solution of 30 percent strength has been added, and which has been cooled with ice to 0° C. The dyestuff formed is separated by means of sodium chloride after 6 hours and is dried. The product obtained has in the free state the probable formula from a weakly alkaline dyebath in the presence of copper sulphate and sodium tartrate.

If the mono-azo dyestuff derived from 4-amino-1-hydroxy-benzene-2-carboxylic acid and 1-amino-2-methoxy-5-methylbenzene used in the above example be replaced by 35.1 parts of the mono-azo dyestuff obtained from 4-amino-1-hydroxy-2-carboxybenzene-6-sulphonic acid and 1-methyl-3-aminobenzene, a similar dyestuff is obtained which dyes cotton in shades having equivalent fastness.

*Example 2*

38.1 parts of the aminoazo compound obtained from diazotized 4-amino-6-sulfo-1-hydroxybenzene-2-carboxylic acid and 1-amino-2-methoxy-5-methylbenzene are diazotized at 15–20° C. in 500 parts of water with 28 parts of hydrochloric acid of 30 percent strength and 6.9 parts of sodium nitrite. The diazo compound formed is added after 2 hours to an aqueous solution of 10 percent strength of 74.5 parts of the ternary condensation product obtained from 1 molecule of cyanuric chloride, 1 molecule of 1-amino-8-hydroxynaphthalene-3:6-disulphonic acid, 1 molecule of 4-amino-4'-hydroxy-1:1'-azobenzene-3-carboxylic acid, and 1 molecule of aniline, to which has been added 50 parts of an ammonia solution of 30 percent strength, and which has been cooled with ice to 0° C. The dyestuff formed is salted out with sodium chloride after 2 hours and is dried.

The product, which in the free state is a dark-coloured powder of the probable formula

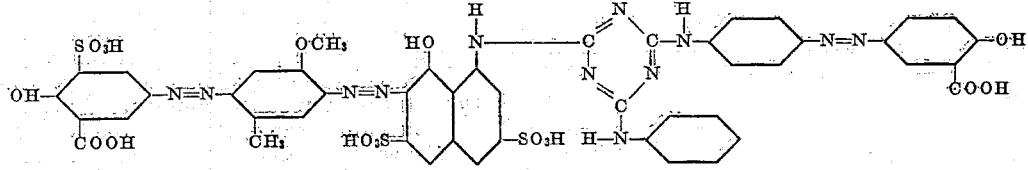

dyes cotton in green shades, fast to washing, from a weakly alkaline bath in the presence of copper sulphate and sodium tartrate.

*Example 3*

25.7 parts of 4-amino-4'-hydroxy-1:1'-azobenzene-3'-carboxylic acid are added, in the form of a neutral solution in 1000 parts of water, to a suspension of 18.5 parts of cyanuric chloride in 500 parts of water. The temperature of the reaction mixture is kept at 10–14° C. for 4 hours, the hydrochloric acid formed by the condensation being neutralized with the equivalent quantity of sodium carbonate. To this mono-condensation product a neutral solution of 71.1 parts of the disazo dyestuff prepared by coupling diazotized 4-amino-6-sulfo-1-hydroxybenzene-2-carboxylic acid and 1-amino-2-methoxy-5-methylbenzene, further diazotizing and coupling with 1-amino-8-hydroxynaphthalene-3:6-disulphonic acid in 1000 parts of water is added, and

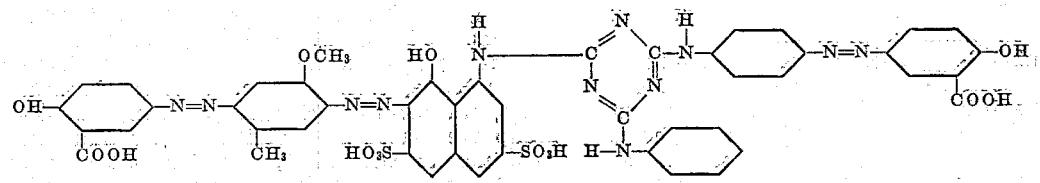

and is a dark-colored powder which dyes cotton in bluish-green shades, fast to washing, the temperature is raised to 40° C. This temperature is maintained for 5 hours, the liberated hydrochloric acid being neutralized little by little with the equivalent quantity of sodium carbonate. A neutral solution of 15.5 parts of 4-amino-1-hydroxybenzene-2-carboxylic acid in 200 parts of water is now run in, and the temperature is maintained for 3 hours at 85–90° C. The reaction solution is then made definitely alkaline with soda, and the tri-condensation product is separated by means of sodium chloride and dried.

The product, which in the free state is a dark-coloured powder of the probable formula 500 parts of water with 28 parts of hydrochloric acid of 30 percent strength and 6.9 parts of sodium nitrite. The diazo-azo compound formed is added, after 2 hours, to an aqueous solution of 10 percent strength of 15.4 parts of the di-condensation product obtained from 1 molecule of di-chloro-acetoguanamide, 1 molecule of 1-amino-8-hydroxynaphthalene-3:6-disulphonic acid and 1 molecule of 4-amino-4'-hydroxy-1:1'-azo-benzene-3-carboxylic acid, to which 50 parts of an ammonia solution of 30 percent strength has been added, and which has been cooled to 0° C.

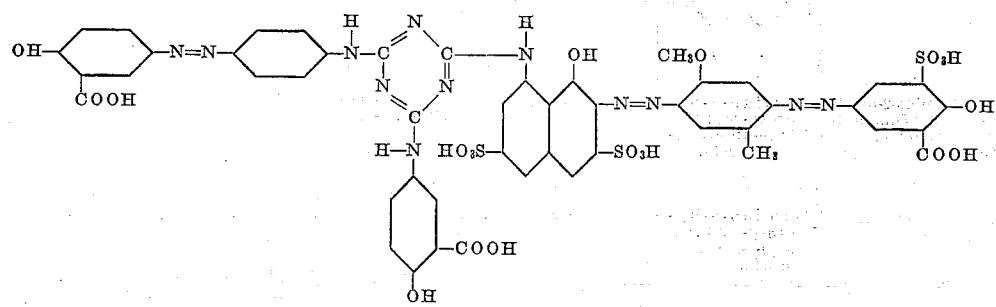

dyes cotton in green shades, fast to light and washing, from a weakly alkaline dyebath in the presence of copper sulphate and sodium tartrate.

with ice. The dyestuff formed is salted out with sodium chloride after 6 hours and is dried.

The product, which in the free state is a dark-coloured powder of the probable formula

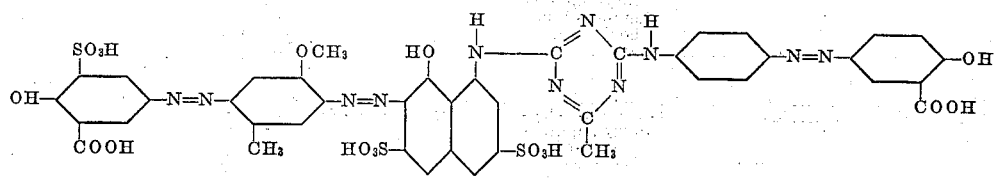

*Example 4*

38.1 parts of the aminoazo compound obtained from diazotized 4-amino-6-sulfo-1-hydroxybenzene-2-carboxylic acid and 1-amino-2-methoxy-5-methylbenzene are diazotized at 15–20° C. in dyes cotton in green shades, fast to washing, from a weakly alkaline dyebath in the presence of copper sulphate and sodium tartrate.

The following table gives information regarding other dyestuffs which may be prepared according to the present invention.

| I | II | III 1-amino-8-hydroxy-naphthalene sulphonic acid corresponding to the symbol | IV | V | VI | VII |
|---|---|---|---|---|---|---|
| Component corresponding to radical R₁ | Component corresponding to radical R₂ | | Component corresponding to connecting member $x$ | Azo dyestuff corresponding to radical $-R_3-N=N-R_4$ | Third component, in case the component of symbol $x$ should be a heterocyclic compound with 3 reactive halogen atoms | Color of dyeings |
| 1  4-amino-1-hydroxy-benzene-2-carboxylic acid. | 1-amino-2-methoxy-benzene. | 1-amino-8-hydroxy-naphthalene-3:6-disulphonic acid. | Cyanuric chloride. | 4-amino-4'-hydroxy-1'1-azobenzene-3'-carboxylic acid. | Aniline | Green. |
| 2  4-amino-6-sulfo-1-hydroxy-benzene-2-carboxylic acid. | 1-amino-2-methoxy-5-methyl-benzene. | ----do---- | ----do---- | 4-amino-2-methyl-4'-hydroxy-1'1-azobenzene-3'-carboxylic acid. | ----do---- | Bluish-green. |
| 3  4-amino-1-hydroxy-benzene-2-carboxylic acid. | 2-amino-benzoic acid.¹ | ----do---- | ----do---- | 4-amino-4'-hydroxy-1.1'-azobenzene - 3' - carboxylic acid. | ----do---- | Do. |
| 4  4-amino-6-sulfo-1-hydroxy-benzene-2-carboxylic acid. | 1-amino-2-methoxy-5-methyl-benzene. | ----do---- | ----do---- | ----do---- | Methylaniline | Green. |
| 5  ----do---- | ----do---- | ----do---- | 4-methyl-2:6-dichloropyrimidin. | ----do---- | | Bluish-green. |
| 6  ----do---- | ----do---- | ----do---- | Dichloroquinazoline. | ----do---- | | Do. |

See footnote at end of table.

| | I | II | III | IV | V | VI | VII |
|---|---|---|---|---|---|---|---|
| | Component corresponding to radical $R_1$ | Component corresponding to radical $R_2$ | 1-amino-8-hydroxy-naphthalene sulphonic acid corresponding to the symbol | Component corresponding to connecting member $x$ | Azo dyestuff corresponding to radical $-R_3-N=N-R_4$ | Third component, in case the component of symbol $x$ should be a heterocyclic compound with 3 reactive halogen-atoms | Color of dyeings |
| 7 | 4-amino-6-sulfo-1-hydroxy-benzene-2-carboxylic acid. | 1-amino-2-methoxy-5-methyl-benzene. | 1-amino-8-hydroxy-naphthalene-4:6-disulphonic acid. | Cyanuric chloride. | 4-amino-4'-hydroxy-1.1'-azobenzene-3'-carboxylic acid. | Aniline | Green. |
| 8 | ...do... | ...do... | ...do... | ...do... | ...do... | Methylaniline | Yellowish green. |
| 9 | ...do... | ...do... | 1-amino-8-hydroxy-naphthalene-4-sulphonic acid. | ...do... | ...do... | Analine | Green. |
| 10 | ...do... | ...do... | ...do... | ...do... | ...do... | 4-amino-1-hydroxy-benzene-2-carboxylic acid. | Do. |
| 11 | 4-amino-1-hydroxy-benzene-2-carboxylic acid. | ...do... | 1-amino-8-hydroxy-naphthalene-2:4-disulphonic acid. | ...do... | ...do... | ...do... | Do. |
| 12 | ...do... | ...do... | 1-amino-8-hydroxy-naphthalene-3:6-disulphonic acid. | ...do... | 3-amino-4'-hydroxy-1.1'-azobenzene-3'-carboxylic acid. | Aniline | Do. |
| 13 | ...do... | ...do... | ...do... | ...do... | ...do... | 4-amino-4'-hydroxy-1.1'-azobenzene-3'-carboxylic acid. | Yellowish green. |
| 14 | ...do... | ...do... | ...do... | ...do... | ...do... | α-Naphthyl-amine | Green. |
| 15 | ...do... | ...do... | 1-amino-8-hydroxy-naphthalene-3:6-disulphonic acid. | 1-phenyl-3:5-dichlorotriazine. | 4-amino-4'-hydroxy-1.1'-azobenzene-3'-carboxylic acid. | | Do. |

¹ The initial mono-azo dyestuff is prepared in this case from diazotized 6-nitro-3-aminobenzene-1-carboxylic acid by coupling with 1-hydroxybenzene-2-carboxylic acid and reduction of the nitro group to the amino group.

The formulas corresponding to the dyestuffs 3, 5, 7 and 15, in their free state, are as follows:

(3)
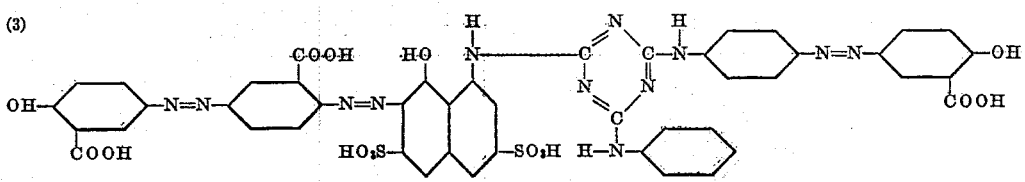

(5)
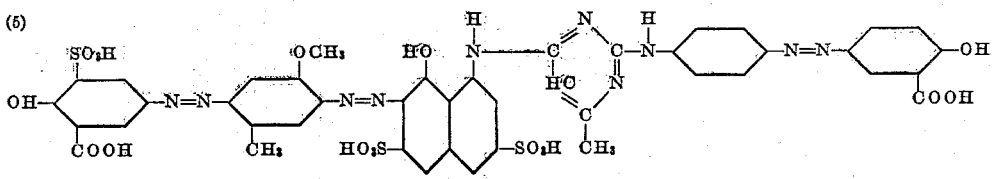

(7)
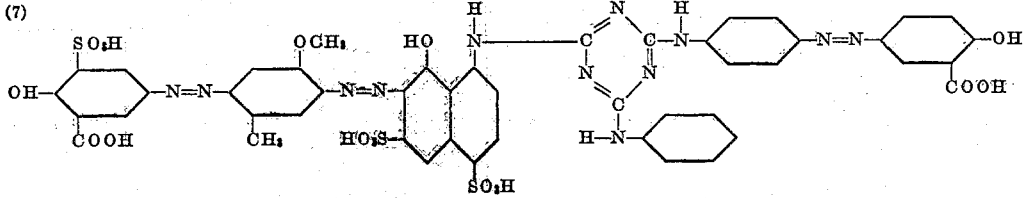

(15)
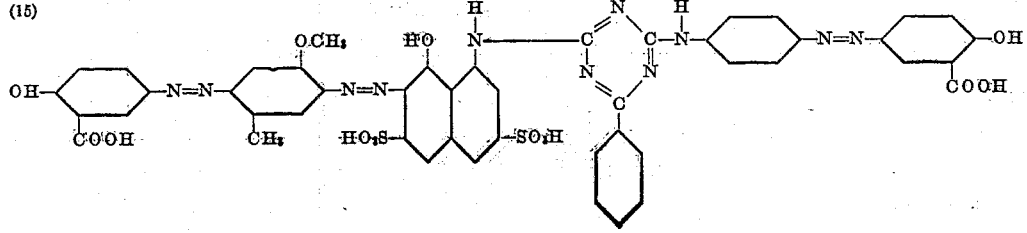

Example 5

A dyebath is prepared containing 3000 parts of water, 1.5 parts of the dyestuff prepared as described in the first paragraph of Example 1 and 2 parts of anhydrous sodium carbonate. 100 parts of cotton are entered into this bath at 40–50° C., and the bath is heated during ½ hour to 90–95° C., when 30 parts of crystalline sodium sulphate are added and dyeing is continued at this temperature for a further ¾ hour. A solution of 100 parts of water, 2 parts of crystalline copper sulphate and 2.5 parts of tartaric acid, which has been neutralized with caustic soda, is now added to the dyebath, and the cotton is treated for a further ½ hour at about 95° C., after which it is rinsed and dried as usual. It is dyed in a fast, pure green shade.

The dyestuffs described in this application may also be used on composite fabrics, for example, fabrics consisting of wool and viscose staple fibre. In such cases it is advisable to dye the material in a neutral dyebath in the presence of sodium or potassium chromate.

What I claim is:

1. The dyestuffs which, in the free state, correspond to the general formula

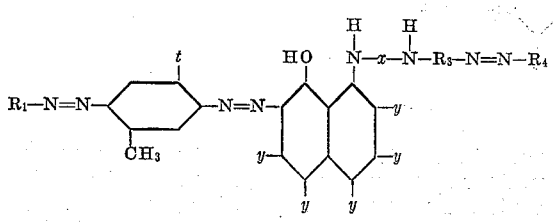

wherein $R_1$ and $R_4$ stand for radicals of mononuclear compounds of the benzene series which contain, as substituents, at least one OH-group and one COOH-group in o-position to this OH-group, $t$ stands for a member of the group consisting of hydrogen and lower alkoxy, $R_3$ stands for an arylene radical of the benzene series in which the NH-group and the —N=N-group are placed in a position other than the o-position to each other, wherein further at least one $y$ and at most two $y$'s stand for sulphonic groups and the other $y$'s for hydrogen atoms, provided that when two $y$'s represent sulphonic groups they are separated by at least one $y$ representing a hydrogen atom and, if the $y$ in the 2-position represents a sulphonic group, the $y$ in the 4-position also represents a sulphonic group, and wherein, finally, $x$ represents the radical of a heterocyclic six-membered system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and not more than three times the atom grouping

in which one of the carbon valencies is linked to a radical each of the aminoazo dyestuffs, which dyestuffs, in the form of their sodium salts, dissolve in water to green solutions from which the vegetable fiber is dyed green shades.

2. The dyestuffs which, in the free state, correspond to the general formula

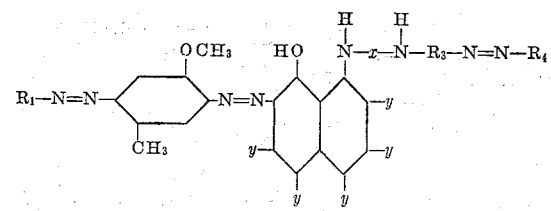

wherein $R_1$ and $R_4$ stand for radicals of mononuclear compounds of the benzene series which contain, as substituents, at least one OH-group and one COOH-group in o-position to this OH-group, $R_3$ stands for an arylene radical of the benzene series in which the NH-group and the —N=N-group are placed in a position other than the o-position to each other, wherein further at least one $y$ and at most two $y$'s stand for sulphonic groups and the other $y$'s for hydrogen atoms, provided that when two $y$'s represent sulphonic groups they are separated by at least one $y$ representing a hydrogen atom and, if the $y$ in the 2-position represents a sulphonic group, the $y$ in the 4-position also represents a sulphonic group, and wherein, finally, $x$ represents the radical of a triazine complex to carbon atoms of which the two —NH-groups of the aminoazo dyestuff radicals are linked, which dyestuffs dye cotton in green shades, fast to washing, from a weakly alkaline dyebath in the presence of copper sulfate and sodium tartrate.

3. The dyestuffs which, in the free state, correspond to the general formula

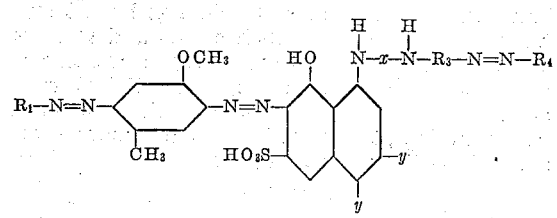

wherein $R_1$ and $R_4$ stand for radicals of mononuclear compounds of the benzene series which contain, as substituents, at least one OH-group and one COOH-group in o-position to this OH-group, $R_3$ stands for an arylene radical of the benzene series in which the NH-group and the —N=N-group are placed in a position other than the o-position to each other, wherein further one $y$ stands for a sulfo-group and the other $y$ for a hydrogen atom, and wherein, finally, $x$ represents the radical of a heterocyclic six-membered system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and not more than three times the atom grouping

in which one of the carbon valencies is linked to a radical each of the aminoazo dyestuffs, which dyestuffs dye cotton in green shades, fast to washing, from a weakly alkaline dyebath in the presence of copper sulfate and sodium tartrate.

4. The dyestuffs which, in the free state, correspond to the general formula

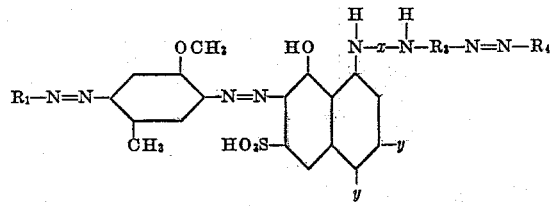

wherein $R_1$ and $R_4$ stand for radicals of mononuclear compounds of the benzene series which contain, as substituents, at least one OH-group and one COOH-group in o-position to this OH-group, $R_3$ stands for an arylene radical of the benzene series in which the NH-group and the —N=N-group are placed in the 1:4-positions to each other, wherein further one $y$ stands for a sulfo-group and the other $y$ for a hydrogen atom, and wherein, finally, $x$ represents the radical of a heterocyclic six-membered system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and not more than three times the atom grouping

in which one of the carbon valencies is linked to a radical each of the aminoazo dyestuffs, which dyestuffs dye cotton in green shades, fast to washing, from a weakly alkaline dyebath in the presence of copper sulfate and sodium tartrate.

5. The dyestuffs which, in the free state, correspond to the general formula

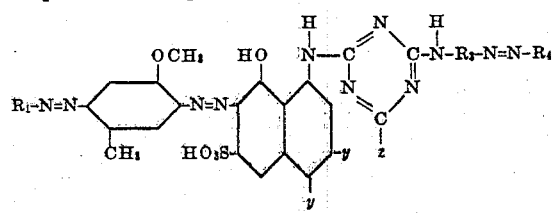

wherein $R_1$ and $R_4$ stand for radicals of mononuclear compounds of the benzene series which contain, as substituents, at least one OH-group and one COOH-group in o-position to this OH-group, $R_3$ stands for an arylene radical of the benzene series in which the NH-group and the —N=N-group are placed in the para-position to each other, wherein further one $y$ stands for a sulfo-group and the other $y$ for a hydrogen atom, and wherein, finally, $z$ represents the radical of an amine selected from the group consisting of primary and secondary amines, the amine being linked to the cyanuric nucleus by a nitrogen atom, which dyestuffs dye cotton in green shades, fast to washing, from a weakly alkaline dyebath in the presence of copper sulfate and sodium tartrate.

6. The dyestuffs which, in the free state, correspond to the general formula

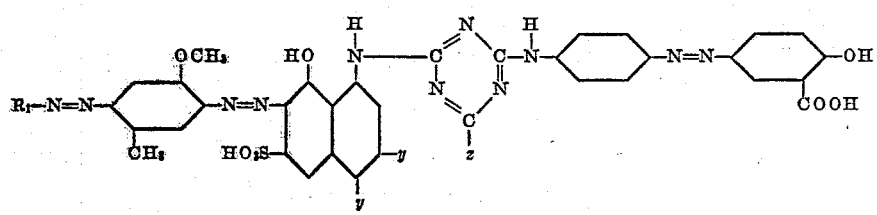

wherein $R_1$ stands for the radical of a mononuclear compound of the benzene series which contains, as substituents, at least one OH-group and one COOH-group in o-position to this OH-group, wherein further one $y$ stands for a sulfo-group and the other $y$ for a hydrogen atom, and wherein, finally, $z$ stands for the radical of an amine selected from the group consisting of primary and secondary amines, the amine being linked to the cyanuric nucleus by a nitrogen atom, which dyestuffs dye cotton in green shades, fast to washing, from a weakly alkaline dyebath in the presence of copper sulfate and sodium tartrate.

7. The dyestuffs which, in the free state, correspond to the general formula

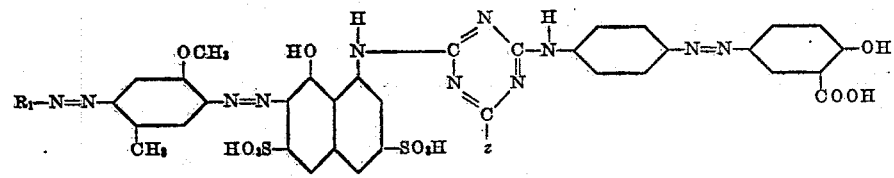

wherein $R_1$ stands for the radical of a mononuclear compound of the benzene series which contains, as substituents, at least one OH-group and one COOH-group in o-position to this OH-group, and $z$ stands for the radical of an amine selected from the group consisting of primary and secondary amines, the amine being linked to the cyanuric nucleus by a nitrogen atom, which dyestuffs dye cotton in green shades, fast to washing, from a weakly alkaline dyebath in the presence of copper sulfate and sodium tartrate.

8. The dyestuff which, in the free state, corresponds to the formula
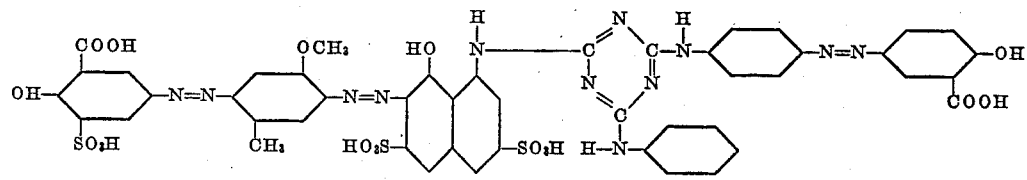
9. The dyestuff which, in the free state, corresponds to the formula
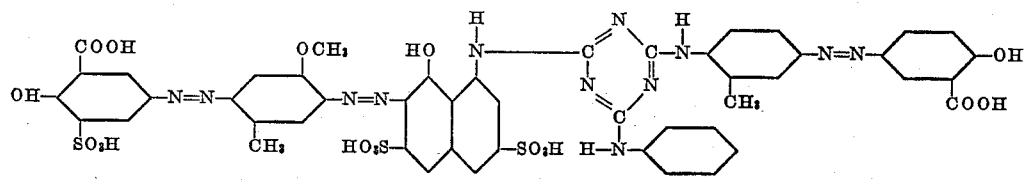
OTTO KAISER.